(12) United States Patent
Rajagopalan et al.

(10) Patent No.: US 11,384,289 B2
(45) Date of Patent: Jul. 12, 2022

(54) CONVERSION OF METHANOL TO GASOLINE WITH INTEGRATED PARAFFIN CONVERSION

(71) Applicant: ExxonMobil Technology and Engineering Company, Annandale, NJ (US)

(72) Inventors: Suriyanarayanan Rajagopalan, Spring, TX (US); Mohsen Harandi, New Hope, PA (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 3 days.

(21) Appl. No.: 16/737,210

(22) Filed: Jan. 8, 2020

(65) Prior Publication Data
US 2020/0231880 A1     Jul. 23, 2020

Related U.S. Application Data

(60) Provisional application No. 62/794,125, filed on Jan. 18, 2019.

(51) Int. Cl.
*B01J 8/26*     (2006.01)
*C10G 3/00*     (2006.01)
*B01J 8/00*     (2006.01)
*B01J 29/40*    (2006.01)

(52) U.S. Cl.
CPC .............. *C10G 3/49* (2013.01); *B01J 8/0015* (2013.01); *B01J 8/26* (2013.01); *B01J 29/405* (2013.01);
(Continued)

(58) Field of Classification Search
CPC ... C10G 3/42; C10G 3/49; C10G 3/62; C10G 2300/1088; C10G 2300/202;
(Continued)

(56) References Cited

U.S. PATENT DOCUMENTS

| 4,016,218 A |   | 4/1977 | Haag et al. |
| 4,392,989 A | * | 7/1983 | Chu .................... B01J 29/40 |
|             |   |        | 502/61 |

(Continued)

FOREIGN PATENT DOCUMENTS

WO    2018/007484 A    1/2018

OTHER PUBLICATIONS

The International Search Report and Written Opinion for PCT/US2020/012692 dated Apr. 22, 2020.
(Continued)

*Primary Examiner* — Youngsul Jeong
*Assistant Examiner* — Jason Y Chong
(74) *Attorney, Agent, or Firm* — Liza Negron

(57) ABSTRACT

Systems and methods are provided for conversion of methanol to gasoline in an integrated system that can also upgrade light paraffins generated by the methanol conversion process to aromatics. In some aspects, the integrated configuration can include integration of the stage for upgrading of light paraffins to aromatics into the product separation sequence for processing of the methanol conversion effluent. In other aspects, the integrated configuration can further include sharing a common catalyst between the methanol conversion stage and the stage for upgrading light paraffins to aromatics.

14 Claims, 3 Drawing Sheets

(52) U.S. Cl.
CPC ............... *B01J 2208/00752* (2013.01); *C10G 2300/1088* (2013.01); *C10G 2300/202* (2013.01); *C10G 2400/02* (2013.01); *C10G 2400/30* (2013.01)

(58) Field of Classification Search
CPC ................. C10G 2400/02; C10G 2400/30; C10G 50/00; B01J 8/0015; B01J 8/26; B01J 29/405; B01J 2208/00752; Y02P 20/52; Y02P 30/20
See application file for complete search history.

(56) References Cited

U.S. PATENT DOCUMENTS

| | | |
|---|---|---|
| 4,696,732 A | 9/1987 | Angevine et al. |
| 4,709,113 A | 11/1987 | Harandi et al. |
| 4,835,329 A | 5/1989 | Harandi et al. |
| 5,019,663 A | 5/1991 | Chou et al. |
| 2013/0046122 A1* | 2/2013 | Vermeiren ............ C10G 69/06 585/251 |
| 2015/0045456 A1 | 2/2015 | Schoedel et al. |
| 2015/0175897 A1* | 6/2015 | Loveless ................. C10G 3/45 585/408 |
| 2016/0102031 A1 | 4/2016 | Du et al. |
| 2016/0178132 A1 | 6/2016 | Harandi et al. |
| 2018/0002265 A1 | 1/2018 | Wright et al. |

OTHER PUBLICATIONS

Chen, Nai Y., et al. "M2 Forming—A Process for Aromatization of Light Hydrocarbons", Ind. Eng. Chem. Process Des. Dev., vol. 25, pp. 151-155, 1986.

* cited by examiner

CONVERSION OF METHANOL TO GASOLINE WITH INTEGRATED PARAFFIN CONVERSION

CROSS-REFERENCE TO RELATED APPLICATIONS

This application claims the benefit of U.S. Provisional Application No. 62/794,125 filed on Jan. 18, 2019, the entire contents of which are incorporated herein by reference.

FIELD

Systems and methods are provided for integration of a methanol to gasoline process and a paraffins to aromatics process.

BACKGROUND

A variety of industrial processes are known for conversion of low boiling carbon-containing compounds to higher value products. For example, methanol to gasoline (MTG) is a commercial process that produces gasoline from methanol using ZSM-5 catalysts. In the MTG process, methanol is first dehydrated to dimethyl ether. The methanol and/or dimethyl ether then react in a series of reactions that result in formation of aromatic, paraffinic, and olefinic compounds. The resulting product consists of liquefied petroleum gas (LPG) and a high-quality gasoline comprised of aromatics, paraffins, and olefins. The typical MTG hydrocarbon product consists of 40-50% aromatics plus olefins and 50-60% paraffins.

One difficulty with conventional processes for conversion of methanol to gasoline is that $C_3$-$C_4$ paraffins can be generated in a yield of 5 wt % to 10 wt % relative to the amount of converted methanol. Although $C_3$-$C_4$ paraffins can potentially be sold as liquefied petroleum gas, the value of LPG is relatively low in comparison with the costs involved in methanol conversion. It would be desirable to reduce the net yield of light paraffins generated during a MTG process while maintaining or increasing overall gasoline yield.

U.S. Pat. No. 5,019,663 describes methods for co-conversion of $C_2$-$C_4$ paraffins with methanol in the presence of a zeolitic catalyst. The conditions allow for conversion of the paraffins to aromatics. The exothermic nature of methanol conversion provides the heat for the endothermic aromatic formation reaction.

Various references describe conversion of methanol to gasoline and/or aromatics. For example, U.S. Patent Application Publication 2016/0102031 describes an apparatus and process for producing gasoline, olefins, and aromatics from oxygenates.

SUMMARY OF THE INVENTION

In some aspects, a method for conversion of an oxygenate feed is provided. The method can include exposing a feed comprising one or more oxygenates to a first conversion catalyst at an average reaction temperature of 230° C. to 425° C., a total pressure of 10 psig (~70 kPag) to 400 psig (~2800 kPag), and a WHSV of 0.1 hr$^{-1}$ to 10.0 hr$^{-1}$, to form a conversion effluent. A light paraffin stream including $C_3$-$C_4$ paraffins and a stream comprising $C_{5+}$ hydrocarbons can be separated from the conversion effluent. At least a portion of the light paraffin stream and an oxygenate co-feed can then be exposed to a second conversion catalyst at an average reaction temperature of 450° C. or more to form an upgraded effluent comprising aromatics. Optionally, a weight ratio of the oxygenate co-feed to $C_3$-$C_4$ paraffins in the at least a portion of the light paraffin stream can be 1.0 to 1.5.

In some aspects, a system for conversion of an oxygenate feed is provided. The system can include a conversion reactor that includes a conversion feed inlet, a first conversion catalyst, and a conversion effluent outlet. The system can further include a separation stage that includes a separation inlet in fluid communication with the conversion effluent outlet, a light paraffin outlet, and a $C_{5+}$ outlet. The system can further include an upgrading reactor that includes an upgrading reactor feed inlet in fluid communication with the light paraffin outlet, a second conversion catalyst, and an upgraded effluent outlet.

DETAILED DESCRIPTION

Figure 1:
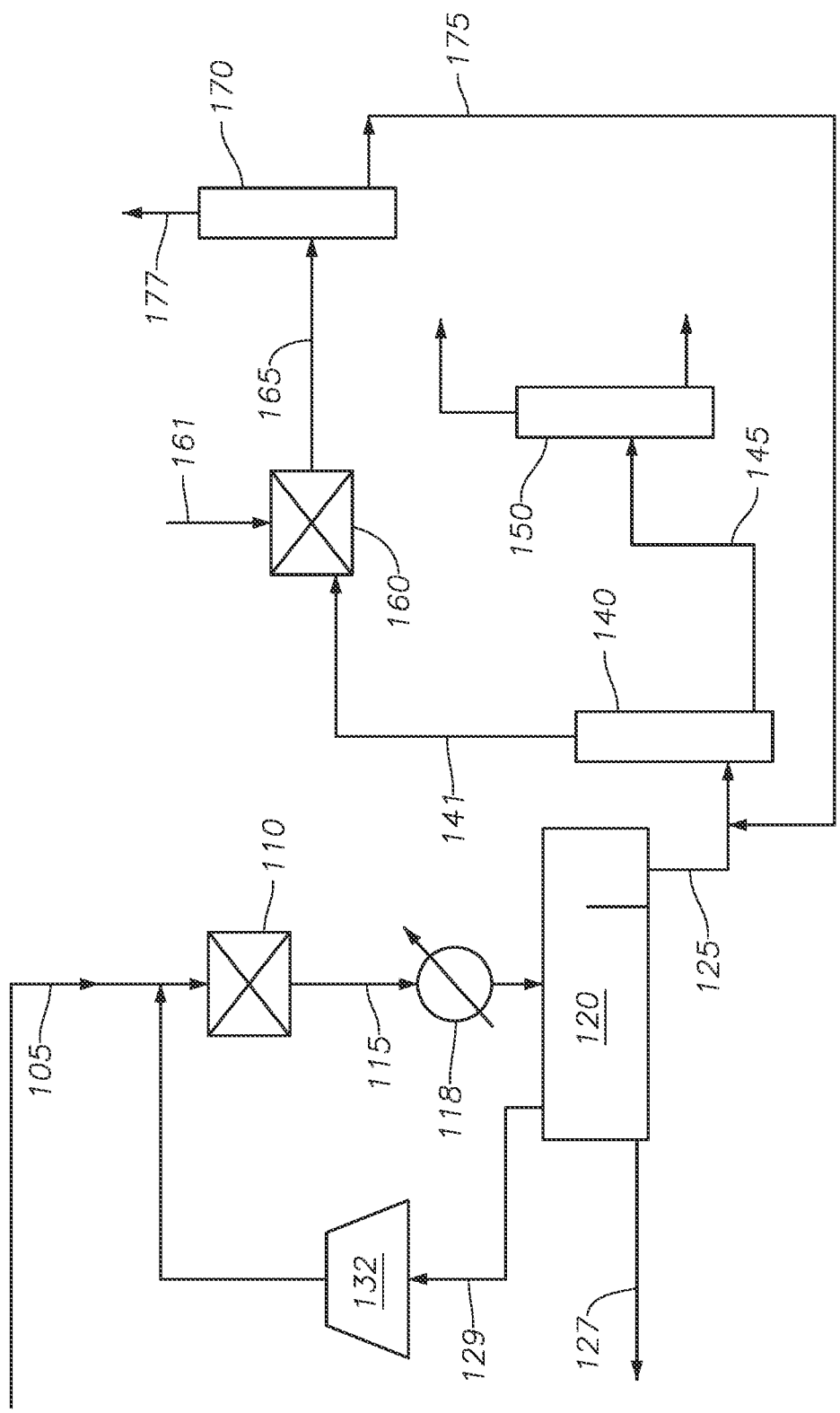
FIG. 1 shows an example of an integrated reaction system for conversion of oxygenates to gasoline and conversion of paraffins to aromatics.

In various aspects, systems and methods are provided for conversion of methanol to gasoline in an integrated system that can also upgrade light paraffins generated by the methanol conversion process to aromatics. In some aspects, the integrated configuration can include integration of the stage for upgrading of light paraffins to aromatics into the product separation sequence for processing of the methanol conversion effluent. In other aspects, the integrated configuration can further include sharing a common catalyst between the methanol conversion stage and the stage for upgrading light paraffins to aromatics.

In a typical fluidized bed process for conversion of methanol to gasoline, the yield of gasoline boiling range components ($C_{5+}$) can be up to roughly 35 wt % relative to the weight of the methanol (or other oxygenate) feed. The $C_3$ and $C_4$ paraffins generated during such a process can correspond to roughly 7 wt % or 8 wt % of the feed. Thus, the weight of $C_3$-$C_4$ paraffins corresponds to roughly 20% of the weight of the $C_{5+}$ products. In various aspects, an increased yield of $C_{5+}$ components can be generated by converting at least a portion of the $C_3$-$C_4$ paraffins to aromatics. This can be achieved while otherwise using similar types of separation stages that would be used for a conventional methanol to gasoline conversion process. By contrast, using conventional methods, the $C_3$-$C_4$ paraffins would be sold as LPG, or possibly recycled to a reforming stage used for generating the oxygenate feed from small alkanes.

In various aspects, the integrated conversion of the $C_3$-$C_4$ paraffins described herein can provide a yield of up to 60 wt % aromatics relative to a weight of the paraffins. To obtain this yield, a weight ratio of methanol to $C_3$-$C_4$ paraffins of 1.0 to 1.5 can be used, such as a weight ratio of roughly 1.3. This weight ratio of methanol can provide an appropriate amount of exothermic heat to balance the endothermic paraffins to aromatics upgrading reaction. Although both $C_3$-$C_4$ paraffins and methanol (or another oxygenate) are consumed to generate the aromatics, the yield is still unexpectedly favorable. With regard to the yield relative to the $C_3$-$C_4$ paraffins, it is noted that the $C_3$-$C_4$ paraffins from a methanol to gas process are a side product, with a primary value as a heating fuel. Thus, the ability to provide a significantly higher value use for this stream, which is created on site, is highly valuable.

With regard to the methanol co-feed, one alternative use could be to allow the $C_3$-$C_4$ paraffins to be used conventionally as LPG. The additional methanol required as co-feed could then be used instead as additional feed for the methanol to gasoline conversion process. However, this would lead to a lower overall yield of both $C_{5+}$ products and aromatics.

To further illustrate this, Table 1 shows an example of predicted yields for a commercial scale integrated reaction system that performs both oxygenate conversion (to gasoline) and paraffin upgrading. For the example in Table 1, methanol is used as the oxygenate feed. The $C_{5+}$ yield and LPG ($C_3$+$C_4$) yields from the conversion reaction are believed to be representative of commercial methanol to gasoline processes. The yield for upgrading of the LPG to aromatics is selected to be 60 wt %.

TABLE 1

| $C_{5+}$ Yield from Integrated Process | | | | |
| --- | --- | --- | --- | --- |
| Feed Methanol kg/hr | $C_{5+}$ Yield (from MTG) kg/hr | LPG yield kg/hr | LPG to Aromatics Yield kg/hr | Increase in $C_{5+}$ Yield |
| 208,333 | 75,000 | 16,000 | 9600 | 12.8% |

The model results in Table 1 demonstrate the benefit of using the light paraffins. Based on a weight ratio for methanol to LPG of roughly 1.3, the additional methanol used for the paraffins to aromatics upgrading process would correspond to 20,800 kg/hr, or roughly 10% of the initial feed. Simply increasing the initial feed amount to the MTG process by 10% (or equivalently running the MTG process for sufficient additional time to process an additional 10% of feed) would result in an increase in $C_{5+}$ yield of 10%, or an additional 7500 kg/hr of $C_{5+}$ products. By contrast, the integrated upgrading of the $C_3$-$C_4$ paraffins results in an additional 9600 kg/hr of aromatics, as shown in Table 1. Thus, using the methanol as a co-feed for the paraffins to aromatics upgrading process allows a low value stream, generated on-site, to provide a substantial yield improvement. It is further noted that the aromatics yield in Table 1 corresponds to only aromatics, and does not include any additional $C_{5+}$ components that are generated in the upgrading reactor. This would further increase the yield advantage of the integrated upgrading process.

Figure 3:
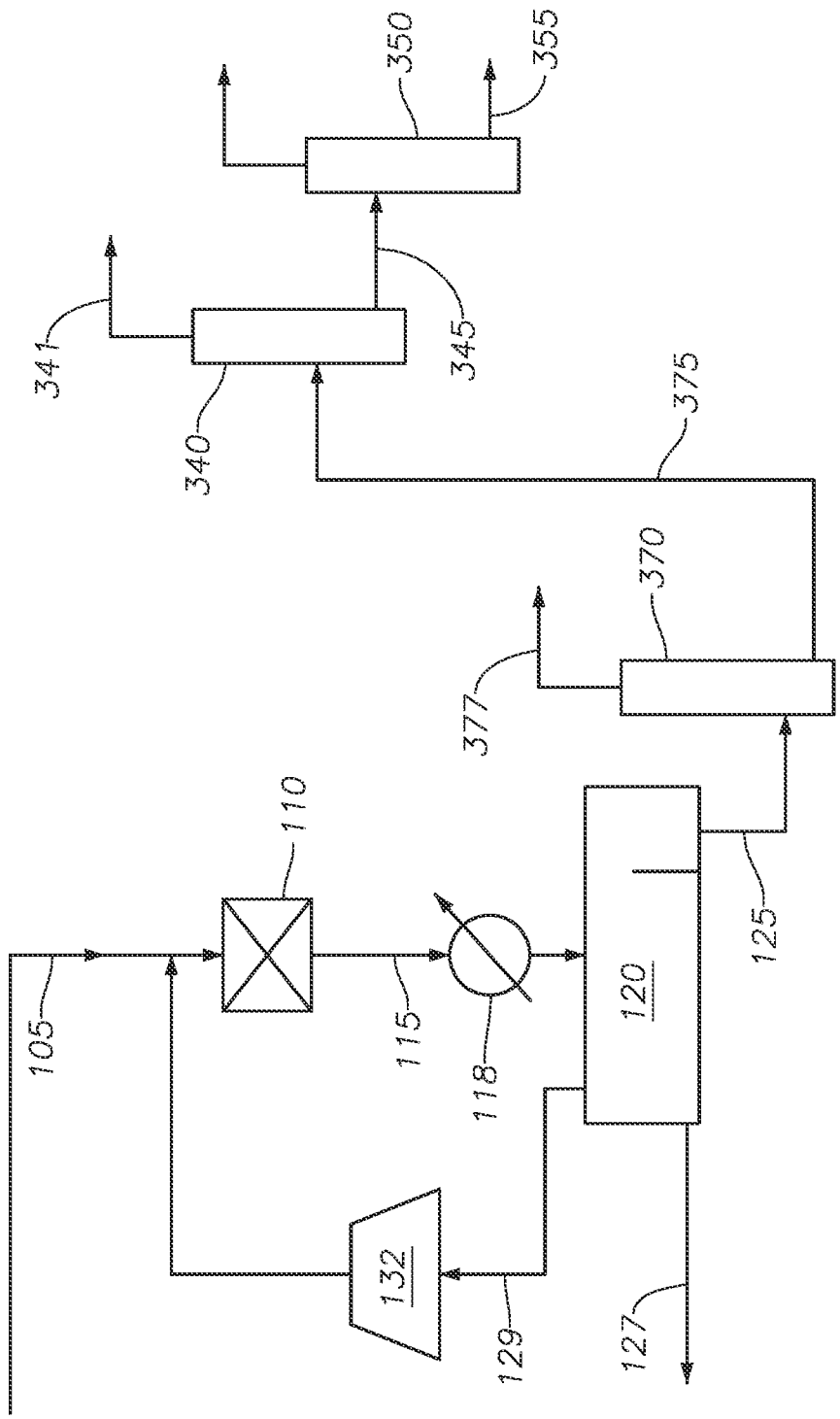
FIG. 3 shows an example of a reaction system for conversion of oxygenates to gasoline.

FIG. 3 shows an example of a potential reaction system configuration for conversion of methanol and/or other oxygenates to gasoline (and/or aromatics and/or olefins). In FIG. 3, a feed 105 including oxygenates is introduced into a conversion reactor 110. Methanol and/or dimethyl ether can be convenient types of oxygenates for use in oxygenate conversion. For example, methanol can be formed by reforming of methane via a synthesis gas intermediate. After reforming, the methanol can optionally be at least partially converted to dimethyl ether, to reduce the amount of heat generated during the oxygenate conversion reaction in conversion reactor 110. The converted effluent 115 can then be cooled 118, and then passed into a product separator 120. Product separator 120 can separate a water stream 127, a hydrocarbon product stream 125, and a light hydrocarbon ($C_{4-}$) recycle stream 129 from the converted effluent 115. The light hydrocarbon recycle stream 129 can be compressed 132 and combined with the feed 105. It is noted that a portion of the $C_{4-}$ hydrocarbons are included in hydrocarbon product stream 125. At steady state, the amount of $C_{4-}$ hydrocarbons included in the hydrocarbon product stream 125 can match the amount of $C_{4-}$ hydrocarbons generated on a single-pass basis by the conversion reaction. It is noted that a portion of the recycled $C_{4-}$ hydrocarbons may correspond to olefins.

The hydrocarbon product stream 125 can include both $C_{5+}$ components, which are desirable for inclusion in gasoline, and $C_{4-}$ hydrocarbons. In the configuration shown in FIG. 3, the hydrocarbon product stream 125 is passed into a de-ethanizer 370 for separation of $C_2$-hydrocarbons 377 (e.g., ethane, ethene, methane) from the remaining de-ethanized effluent 375. The de-ethanized effluent 375 can then be passed into stabilizer 340. This can allow for separation of a $C_3$-$C_4$ hydrocarbon fraction 341 and a $C_{5+}$ fraction 345 from the de-ethanized effluent 375. The $C_{5+}$ fraction 345 can then be passed into fractionator 350 to form one or more desired fuel boiling range fractions, such as a light gasoline fraction 355 corresponding to $C_{8-}$ components and a $C_{9+}$ stream that can include any durene generated during the process.

FIG. 1 shows an example of how a stage for upgrading light paraffins to aromatics can be incorporated into the process train for an oxygenate conversion process. In FIG. 1, the oxygenate feed 105, methanol conversion reactor 110, and product separator 120 can be similar to the corresponding elements in the configuration shown in FIG. 3. However, hydrocarbon product stream 125 can be processed in a different manner to allow for incorporation of an upgrading stage for upgrading of light paraffins to aromatics.

In the configuration shown in FIG. 1, hydrocarbon product stream 125 is passed into a stabilizer 140. This can allow for separation of a $C_{4-}$ stream 141 and $C_{5+}$ stream 145 from the hydrocarbon product stream 125. It is noted that $C_{4-}$ stream 141 still contains $C_{2-}$ hydrocarbons that may have been formed in the conversion reactor 110. The $C_{4-}$ stream can then be passed into upgrading stage 160, for upgrading of paraffins to aromatics. Due to the endothermic nature of the reaction for upgrading of paraffins to aromatics, a methanol stream 161 (or other oxygenate stream) is also introduced into upgrading stage 160. The catalyst in upgrading stage 160 can also be suitable for performing oxygenate conversion. This can allow the heat generated from oxygenate conversion to balance with the heat required to perform the paraffins to aromatics upgrading reaction. Optionally, oxygenate stream 161 can correspond to a stream from the same source as oxygenate stream 105.

The upgrading stage 160 can generate an upgraded product stream 165 including additional aromatics generated from upgrading of the light paraffins. The upgraded product stream 165 can then be passed into a de-ethanizer 170 to remove $C_{2-}$ hydrocarbons 177, thus producing a de-ethanized stream 175. This can allow the $C_3$ and $C_4$ paraffins, plus any aromatics generated by the upgrading process, to be recycled back for combination with hydrocarbon product stream 125, while removing at least a portion of any lower activity ethane that may be present. This can substantially reduce the size of the recycle loop needed for de-ethanized stream 175. The de-ethanized stream 175 can also include any $C_{5+}$ compounds (including aromatics) that are formed in upgrading stage 160. The additional $C_{5+}$ compounds can be combined with hydrocarbon product stream 125 and separated into desired fuels fraction(s) in fractionator 150.

Based on the configuration in FIG. 1, it is noted that an integrated system that provides upgrading of paraffins to aromatics can use the same types of de-ethanizer, stabilizer, and fractionation stages can be used. Thus, the upgrading stage 160 corresponds to the only additional reactor(s) that are needed to achieve an additional yield of aromatics.

Figure 2:
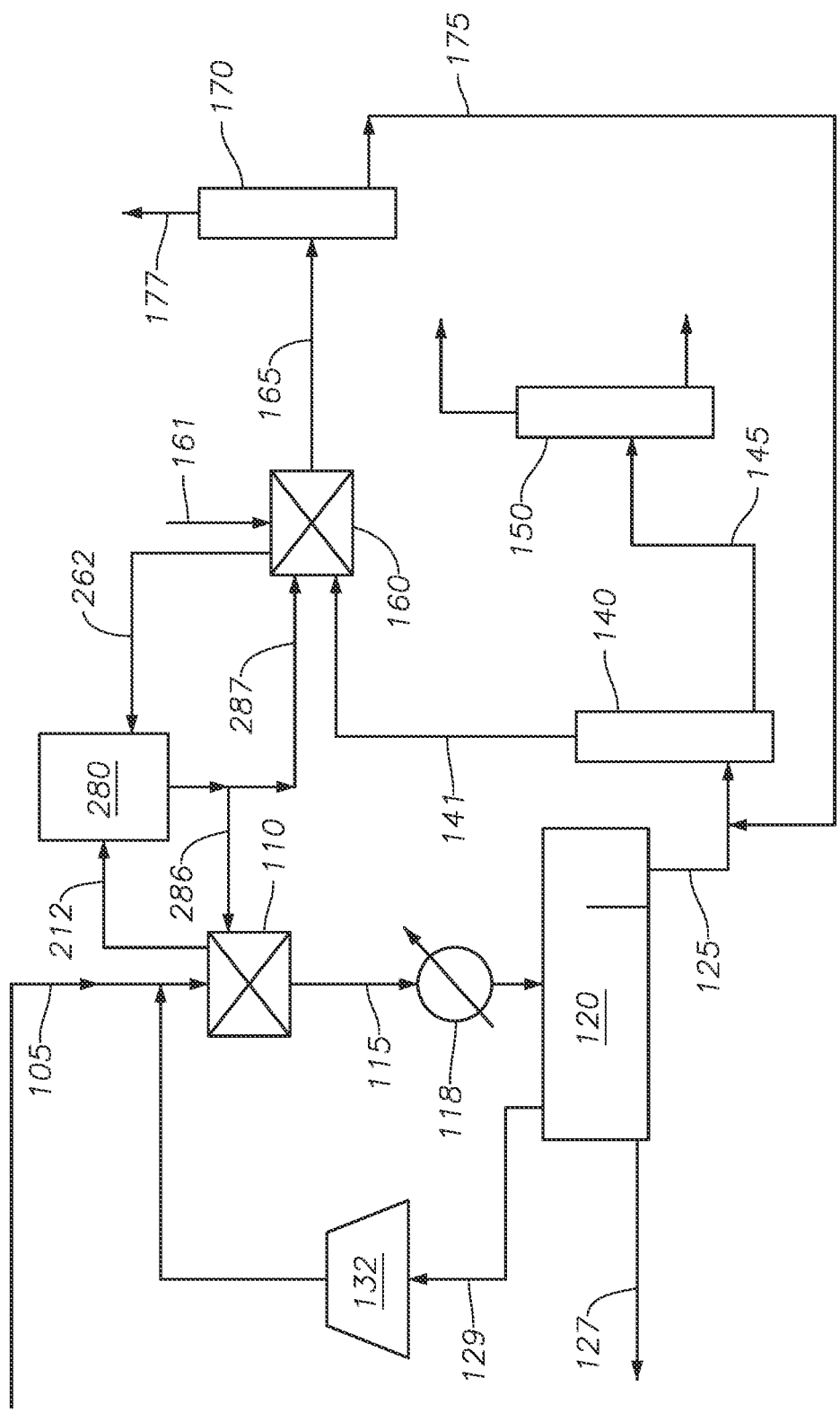
FIG. 2 shows another example of an integrated reaction system for conversion of oxygenates to gasoline and conversion of paraffins to aromatics.

FIG. 2 shows an example of still another potential integration of methanol to gasoline production with paraffin to aromatics upgrading. In the configuration shown in FIG. 1, the conversion stage 110 and the paraffin to aromatics upgrading stage 160 correspond to separate process stages. In the configuration shown in FIG. 2, a further integration is provided, so that the conversion stage 110 and the paraffin to aromatics upgrading stage 160 can share a common catalyst, even though the conditions in conversion stage 110 and upgrading stage 160 are otherwise independently selected. This can be accomplished, for example, in aspects where both conversion stage 110 and paraffin to aromatics upgrading stage 160 correspond to fluidized bed reactors and/or moving bed reactors, so that catalyst can be readily withdrawn from the reactor and passed into a regenerator. In the configuration shown in FIG. 2, a common regenerator 280 is used for regeneration of the catalyst in both conversion stage 110 and paraffin to aromatics upgrading stage 160. Thus, during operation of conversion stage 110, catalyst is withdrawn 212 from the conversion stage, regenerated in regenerator 280, and then a regenerated catalyst stream 286 is returned to the conversion stage 110. Similarly, during operation of upgrading stage 160, catalyst is withdrawn 262 from the upgrading stage, regenerated in regenerator 280, and then a regenerated catalyst stream 287 is returned to the upgrading stage 160.

It is noted that in other aspects, separate regenerators can be used for conversion stage 110 and upgrading stage 160, so that the catalysts in the conversion stage and upgrading stage can remain separate. For example, conversion stage 110 can include a conversion regenerator, while upgrading stage 160 can include an upgrading regenerator.

In this discussion, the reactors and other process elements shown in the figures can be described as being in fluid communication. Direct fluid communication corresponds to process elements that are in fluid communication without an intervening process element, such as product separator 120 and stabilizer 140 in FIG. 1. Indirect fluid communication corresponds to process elements that are in fluid communication via an intervening process element, such as conversion reactor 110 and upgrading reactor 160.

In this discussion, a "$C_x$" compound refers to a compound that includes "x" number of carbon atoms. Such a compound can be a hydrocarbon (e.g., alkane or other paraffin, benzene or other aromatic) or such a compound can correspond to a hydrocarbonaceous compound that includes one or more heteroatoms, such as an alcohol. Thus, methanol is a $C_1$ hydrocarbonaceous compound, while phenol is a $C_6$ aromatic hydrocarbonaceous compound. Similarly, a "$C_{x-}$" stream refers to a stream that includes at least one hydrocarbonaceous component containing "x" carbons or less.

In this discussion, $C_2$-$C_4$ paraffins can be referred to as light paraffins. Methane ($C_1$) paraffin may also be present in a stream of light paraffins, but methane can typically have a low reactivity under the reaction conditions described herein. As a result, methane may act like a diluent rather than like a $C_2$-$C_4$ paraffin. It is further noted that the conversion rate for $C_2$ paraffins can be substantially lower than $C_3$ or $C_4$ paraffins under a given set of processing conditions. As a result, the yield for conversion light paraffins to aromatics can mostly correspond to the yield for conversion of $C_3$ or $C_4$ paraffins.

Feedstocks and Products—Oxygenate Conversion

In various aspects, oxygenate feeds can be converted to aromatics and/or olefins products, such as oxygenates containing at least one $C_1$-$C_4$ alkyl group and/or other oxygenates. Examples of suitable oxygenates include feeds containing methanol, dimethyl ether, $C_1$-$C_4$ alcohols, ethers with $C_1$-$C_4$ alkyl chains, including both asymmetric ethers containing $C_1$-$C_4$ alkyl chains (such as methyl ethyl ether, propyl butyl ether, or methyl propyl ether) and symmetric ethers (such as diethyl ether, dipropyl ether, or dibutyl ether), or combinations thereof. It is noted that oxygenates containing at least one $C_1$-$C_4$ alkyl group are intended to explicitly identify oxygenates having alkyl groups containing 4 carbons or less. Preferably the oxygenate feed can include at least 30 wt % of one or more suitable oxygenates, or at least 50 wt %, or at least 75 wt %, or at least 90 wt %, or at least 95 wt %. Additionally or alternately, the oxygenate feed can include at least 50 wt % methanol, such as at least 75 wt % methanol, or at least 90 wt % methanol, or at least 95 wt % methanol. In particular, the oxygenate feed can include 30 wt % to 100 wt % of oxygenate (or methanol), or 50 wt % to 95 wt %, or 75 wt % to 100 wt %, or 75 wt % to 95 wt %. In some aspects, a methanol-containing feed can correspond to a feed where the oxygenate percentage corresponds. The oxygenate feed can be derived from any convenient source. For example, the oxygenate feed can be formed by reforming of hydrocarbons in a natural gas feed to form synthesis gas ($H_2$, CO, $CO_2$), and then using the synthesis gas to form methanol (or other alcohols). As another example, a suitable oxygenate feed can include methanol, dimethyl ether, or a combination thereof as the oxygenate.

In addition to oxygenates, in some aspects the feed can also include olefins. For example, the configuration shown in FIG. 1 includes a recycle loop for $C_{4-}$ hydrocarbons. Any olefins in such a recycle loop can potentially by converted as part of the conversion reaction. Depending on the aspect, the feed can include 1.0 wt % to 40 wt % of olefins (such as olefins containing 6 carbons or less, or 4 carbons or less), or 1.0 wt % to 30 wt %, or 1.0 wt % to 20 wt %, or 5 wt % to 30 wt %, or 5 wt % to 20 wt %. It is noted that the weight percent of olefins in the feed can be dependent on the nature of the olefins. For example, if a $C_5$ olefin is used as the olefin with a methanol-containing feed, the wt % of olefin required to achieve a desired molar ratio of olefin to oxygenate will be relatively high due to the much larger molecular weight of a $C_5$ alkene.

In some aspects, the olefins can be derived from any other convenient source. The olefin feed can optionally include compounds that act as inerts or act as a diluent in the conversion process. For example, a stream of "waste" olefins having an olefin content of 5 vol % to 20 vol % can be suitable as a source of olefins, so long as the other components of the "waste" olefins stream are compatible with the conversion process. For example, the other components of the olefin stream can correspond to inert gases such as $N_2$, carbon oxides, paraffins, and/or other gases that have low reactivity under the conversion conditions. Water can also be present, although it can be preferable for water to correspond to 20 vol % or less of the total feed, or 10 vol % or less.

In addition to oxygenates (and any optional olefins), a feed can also include diluents, such as water (in the form of steam), nitrogen or other inert gases, and/or paraffins or other non-reactive hydrocarbons. In some aspects, the source of olefins can correspond to a low purity source of olefins, so that the source of olefins corresponds to 20 wt % or less of olefins. In some aspects, the portion of the feed corresponding to components different from oxygenates and olefins can correspond to 1 wt % to 60 wt % of the feed, or 1 wt % to 25 wt %, or 10 wt % to 30 wt %, or 20 wt % to 60 wt %. Optionally, the feed can substantially correspond to oxygenates and olefins, so that the content of components different from oxygenates and olefins is 1 wt % or less (such as down to 0 wt %).

The nature of the products generated from oxygenate conversion can vary widely depending on the conversion conditions and the type of conversion catalyst. In some aspects, such as aspects related to oxygenate conversion to produce gasoline using an MFI or MEL framework catalyst, the yield of aromatics relative to the total hydrocarbon product can be 25 wt % to 60 wt %, or 38 wt % to 60 wt %, or 40 wt % to 52 wt %, or 38 wt % to 45 wt %. The aromatics yield can be lower for a 1-dimensional 10-member ring catalyst, such as an MRE framework catalyst, where the aromatics yield can be 10 wt % to 40 wt %. In various aspects, the yield of olefins relative to the total hydrocarbon product can be 2.0 wt % to 40 wt %, or 2.0 wt % to 30 wt %, or 5.0 wt % to 40 wt %, or 10 wt % to 30 wt %. In various aspects, the yield of paraffins relative to the total hydrocarbon product can be 20 wt % to 45 wt %, or 20 wt % to 35 wt %, or 25 wt % to 45 wt %, or 25 wt % to 40 wt %. Optionally, less than 10 wt % of the paraffins can correspond to $C_1$ paraffins (methane).

The total hydrocarbon product in the conversion effluent can include a naphtha boiling range portion, a distillate fuel boiling range portion, and a light ends portion. Optionally but preferably, the conversion effluent can include less than 1.0 wt % of compounds boiling above the distillate fuel boiling range (370° C.+), such as compounds having a final boiling point of 370° C. or less.

In some aspects, the naphtha boiling range portion formed from a conversion process can have an research octane number of 80 or more, or 85 or more, or 90 or more, or 92 or more, or 94 or more, such as up to 100 or possibly still higher. Research octane number (RON) can be determined according to ASTM D2699.

Suitable and/or effective conditions for performing a conversion reaction can include average reaction temperatures of 230° C. to 400° C. (or 300° C. to 400° C.), total pressures between 10 psig (~70 kPag) to 400 psig (~2800 kPag), or 15 psig (~100 kPag) to 150 psig (~1050 kPag), and an oxygenate space velocity between 0.1 $h^{-1}$ to 10 $h^{-1}$ based on weight of oxygenate relative to weight of catalyst. In various aspects, the average reaction temperature in the conversion reactor can be lower than the temperature in the upgrading reactor by 25° C. or more, or 50° C. or more, such as having an average reaction temperature in the conversion reactor that is lower than the temperature in the upgrading reactor by up to 500° C. (or possibly a still greater difference).

Various types of reactors can provide a suitable configuration for performing a conversion reaction. Suitable reactors can include fixed bed reactors (such as trickle bed reactors), moving bed reactors (such as riser reactors), and fluidized bed reactors. In aspects where a common regenerator is used for both the conversion reactor and the paraffin to aromatics upgrading reactor, a fluidized bed reactor or moving bed reactor can be preferred.

Oxygenate Conversion Catalysts

In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework. Thus, "zeolites" as defined herein can include structures such as SAPO and AlPO crystalline frameworks.

A suitable zeolite can include a 10-member or 12-member ring pore channel network, such as a 3-dimensional 10-member ring pore channel. Examples of suitable zeolites having a 3-dimensional 10-member ring pore channel network include zeolites having an MFI or MEL framework, such as ZSM-5 or ZSM-11. ZSM-5 is described in detail in U.S. Pat. Nos. 3,702,886 and Re. 29,948. ZSM-11 is described in detail in U.S. Pat. No. 3,709,979. In some aspects, a zeolite with a 3-dimensional pore channel can be preferred for conversion of methanol, such as a zeolite with an MFI framework. More generally, non-limiting examples of suitable frameworks include framework codes MRE, MTW, TON, MTT, MFI, MEL, BEA, FAU, and CON. Additionally or alternately non-limiting examples of suitable zeolites include ZSM-5, ZSM-11, ZSM-12, ZSM-22, ZSM-23, ZSM-48, beta, USY, and CIT-1.

Generally, a zeolite having desired activity for methanol conversion can have a silicon to aluminum molar ratio of 5 to 200, or 15 to 100, or 20 to 80, or 20 to 40. For example, the silicon to aluminum ratio can be at least 10, or at least 20, or at least 30, or at least 40, or at least 50, or at least 60. Additionally or alternately, the silicon to aluminum ratio can be 300 or less, or 200 or less, or 100 or less, or 80 or less, or 60 or less, or 50 or less.

Typically, reducing the silicon to aluminum ratio in a zeolite will result in a zeolite with a higher acidity, and therefore higher activity for cracking of hydrocarbon or hydrocarbonaceous feeds, such as petroleum feeds. However, with respect to conversion of oxygenates to aromatics, such increased cracking activity may not be beneficial, and instead may result in increased formation of residual carbon or coke during the conversion reaction. Such residual carbon can deposit on the zeolite catalyst, leading to deactivation of the catalyst over time. Having a silicon to aluminum ratio of at least 40, such as at least 50 or at least 60, can reduce or minimize the amount of additional residual carbon that is formed due to the acidic or cracking activity of a catalyst.

It is noted that the molar ratio described above is a ratio of silicon to aluminum. If a corresponding ratio of silica to alumina were described, the corresponding ratio of silica ($SiO_2$) to alumina ($Al_2O_3$) would be twice as large, due to the presence of two aluminum atoms in each alumina stoichiometric unit. Thus, a silicon to aluminum ratio of 10 corresponds to a silica to alumina ratio of 20.

In some aspects, a zeolite in a catalyst can be present at least partly in the hydrogen form. Depending on the conditions used to synthesize the zeolite, this may correspond to converting the zeolite from, for example, the sodium form. This can readily be achieved, for example, by ion exchange to convert the zeolite to the ammonium form followed by calcination in air or an inert atmosphere at a temperature of 400° C. to 700° C. to convert the ammonium form to the active hydrogen form.

Additionally or alternately, a zeolitic catalyst can include and/or be enhanced by a transition metal. The transition metal can be any convenient transition metal selected from Groups 6-15 of the IUPAC periodic table. The transition metal can be incorporated into the zeolite/catalyst by any convenient method, such as by impregnation, by ion exchange, by mulling prior to extrusion, and/or by any other convenient method. Optionally, the transition metal incorporated into a zeolite/catalyst can correspond to two or more metals. After impregnation or ion exchange, the transition metal-enhanced catalyst can be treated in air or an inert atmosphere at a temperature of 400° C. to 700° C. The amount of transition metal can be expressed as a weight percentage of metal relative to the total weight of the catalyst (including any zeolite and any binder). A catalyst can include 0.05 wt % to 20 wt % of one or more transition metals, or 0.1 wt % to 10 wt %, or 0.1 wt % to 5 wt %, or 0.1 wt % to 2.0 wt %. For example, the amount of transition metal can be at least 0.1 wt % of transition metal, or at least 0.25 wt % of transition metal, or at least 0.5 wt %, or at least 0.75 wt %, or at least 1.0 wt %. Additionally or alternately, the amount of transition metal can be 20 wt % or less, or 10 wt % or less, or 5 wt % or less, or 2.0 wt % or less, or 1.5 wt % or less, or 1.2 wt % or less, or 1.1 wt % or less, or 1.0 wt % or less.

A catalyst composition can employ a zeolite in its original crystalline form or after formulation into catalyst particles, such as by extrusion. A process for producing zeolite extrudates in the absence of a binder is disclosed in, for example, U.S. Pat. No. 4,582,815, the entire contents of which are incorporated herein by reference. Preferably, the transition metal can be incorporated after formulation of the zeolite (such as by extrusion) to form self-bound catalyst particles. Optionally, a self-bound catalyst can be steamed after extrusion. The terms "unbound" and "self-bound" are intended to be synonymous and mean that the present catalyst composition is free of any of the inorganic oxide binders, such as alumina or silica, frequently combined with zeolite catalysts to enhance their physical properties.

Suitable binders for zeolite-based catalysts can include various inorganic oxides, such as silica, alumina, zirconia, titania, silica-alumina, cerium oxide, magnesium oxide, yttrium oxide, or combinations thereof. For catalysts including a binder, the catalyst can comprise at least 10 wt % zeolite, or at least 30 wt %, or at least 50 wt %, such as up to 90 wt % or more. Generally, a binder can be present in an amount between 1 wt % and 90 wt %, for example between 5 wt % and 40 wt % of a catalyst composition. In some aspects, the catalyst can include at least 5 wt % binder, such as at least 10 wt %, or at least 20 wt %. Additionally or alternately, the catalyst can include 90 wt % or less of binder, such as 50 wt % or less, or 40 wt % or less, or 35 wt % or less. Combining the zeolite and the binder can generally be achieved, for example, by mulling an aqueous mixture of the zeolite and binder and then extruding the mixture into catalyst pellets. A process for producing zeolite extrudates using a silica binder is disclosed in, for example, U.S. Pat. No. 4,582,815. Optionally, a bound catalyst can be steamed after extrusion.

As an example of forming a bound catalyst, the following procedure describes a representative method for forming silica bound ZSM-5 catalyst particles. ZSM-5 crystal and a silica binder, such as an Ultrasil silica binder, can be added to a mixer and mulled. When it is desired to include a weak base, such as an organic base, the weak base can be added to the ZSM-5 crystals, to the silica binder, or to the mixture of ZSM-5 crystals and silica binder in the mixer. Additional deionized water can be added during mulling to achieve a desired solids content for extrusion. Optionally, a caustic solution can also be added to the mixture and mulled. The mixture can then be extruded into a desired shape, such as 1/10" quadralobes. The extrudates can be dried overnight at 250° F. (121° C.) and then calcined in nitrogen for 3 hours at 1000° F. (538° C.). The extrudates can then be exchanged twice with an 1N solution of ammonium nitrate. The exchanged crystal can be dried overnight at 250° F. (121° C.) and then calcined in air for 3 hours at 1000° F. (538° C.). This results in a silica bound catalyst.

The catalyst compositions described herein can further be characterized based on activity for hexane cracking, or Alpha value. Alpha value is a measure of the acid activity of a zeolite catalyst as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. Higher alpha values correspond with a more active cracking catalyst. For an oxygenate conversion catalyst, Alpha value can be 15 to 150, or 15 to 100, or 15 to 50.

Feedstocks—Paraffin to Aromatics Upgrading

In various aspects, the feed to the upgrading reactor can correspond to a fraction separated from the oxygenate conversion effluent. The separated fraction can correspond to a fraction that includes $C_{4-}$ hydrocarbons. In some aspects, the separated fraction can include 1.0 wt % to 50 wt % of $C_3$-$C_4$ hydrocarbons, or 1.0 wt % to 20 wt %, or 10 wt % to 40 wt %. The weight percentage of hydrocarbons in the feed to the upgrading reactor can depend in part on the nature of the feed to the oxygenate conversion reactor. If the feed to the oxygenate conversion reactor includes inert gases such as $N_2$, such inert gases can potentially be included with the $C_{4-}$ hydrocarbons when separating the $C_{4-}$ hydrocarbons from the conversion effluent. Depending on the nature of the separation, some heavier hydrocarbons can also be present in the feed to the upgrading reactor.

In addition to the separated fraction containing the $C_{4-}$ hydrocarbons, an oxygenate feed can also be introduced into the upgrading reactor. The oxygenate feeds described for oxygenate conversion are suitable. Optionally, the oxygenate feed introduced into the upgrading reactor can be the same as the oxygenate feed for the conversion reactor, and/or the oxygenate feed for the upgrading reactor can be derived from the same source as the oxygenate feed for the conversion reactor. The amount of oxygenate feed introduced into the upgrading reactor can be selected to roughly provide heat balance between the exothermic nature of the oxygenate conversion reaction and the endothermic nature of the paraffin to aromatics upgrading reaction.

Paraffin to Aromatics Upgrading—Conditions and Catalysts

U.S. Pat. No. 5,019,663 describes suitable catalysts and conditions for performing upgrading of paraffins to aromatics while co-feeding oxygenates to the reactor, so that the heat provided by conversion of the oxygenates can balance the heat adsorbed by the upgrading of the paraffins. (U.S. Pat. No. 5,019,663 is incorporated herein by reference for the purpose of describing suitable conditions and catalysts for co-feeding of paraffins and oxygenates for upgrading/ conversion.) Generally, the types of catalysts and reaction conditions suitable for upgrading of light paraffins to aromatics can also be suitable for conversion of oxygenates (such as methanol) to olefins and/or aromatics. In an upgrading stage, the reaction conditions can be selected to improve or optimize the yield of aromatics, such as benzene, toluene, or xylenes.

Catalytic aromatization of light paraffinic streams, e.g. $C_2$-$C_4$ paraffins, commonly referred to as LPG, is strongly endothermic and typically carried out at temperatures between 540° C. and 820° C. (1000° F. and 1500° F.). While the incorporation of hydrogenation/dehydrogenation metals including gallium, platinum, indium, tin and mixtures thereof in zeolite catalysts may reduce the operating temperature to the range of about 400° C. to 600° C. (750° F. to 1100° F.), the problem of transferring sufficient heat to a catalytic reaction zone to carry out the paraffin upgrading reaction remains as an obstacle to commercialization of the process. Table 2 shows examples of suitable reaction conditions for upgrading paraffins to aromatics.

TABLE 2

Upgrading Reaction Process Conditions

| | |
|---|---|
| WHSV (hr$^{-1}$) | Broad range: 0.3-300 |
| | Preferred range: 0.5-10 |
| Operating Pressure (kPa-g) | Broad range: 170-2170 (10-300 psig) |
| | Preferred: 170-790 (10-100 psig) |
| Operating Temperature (° C.) | Broad range: 400° C.-800° C. |
| | Preferred: 400° C.-600° C. |

The conversion of the oxygenated feed stream (methanol, DME) to the hydrocarbons is a strongly exothermic reaction liberating approximately 1480 kJ (1400 Btu) of heat per kilogram of methanol. In an uncontrolled adiabatic reactor this would result in a temperature rise which would lead to extremely fast catalyst aging rates or even to damage to the catalyst. Furthermore, the high temperatures which might occur could cause undesirable products to be produced or the product distribution could be unfavorably changed. It is therefore necessary that some method should be provided to maintain the catalyst bed within desired temperature limits by dissipating the heat of the reaction.

The reaction severity conditions can be controlled to optimize yield of $C_6$-$C_8$ BTX (benzene, toluene and xylene) hydrocarbons. It is understood that aromatics and light olefin production is promoted by those zeolite catalysts having a high concentration of Bronsted acid reaction sites. Accordingly, an important criterion is selecting and maintaining catalyst inventory to provide either fresh or regenerated catalyst having the desired properties. Typically, acid cracking activity (alpha value) can be maintained from high activity values greater than 40 to significantly lower values. If the process is carried out in a fluid bed of catalyst, alpha value may be maintained by controlling fresh catalyst makeup as well as catalyst deactivation and regeneration rates to provide an apparent average alpha value (based on total catalyst inventory) below 40, e.g. about 20.

In various aspects, the endothermic heat of reaction required to aromatize the paraffinic feed in the upgrading reactor can be at least partially supplied by the exothermic conversion of oxygenates to gasoline. Preferred oxygenates include $C_4$-alcohols, such as methanol and/or dimethyl ether. It is noted that methanol is not only a readily available and economical raw material, but is also more strongly exothermic than ethanol or propanol upon catalytic conversion to gasoline. For example, the amount of heat generated in the conversion of the lower alcohols to hydrocarbon mixtures that contain preponderant quantities of gasoline hydrocarbons may be estimated to be in the ranges shown in Table 3.

TABLE 3

Heat Generated from Lower Alcohol Conversion

| | Heat produced, BTU per lb. alcohol |
|---|---|
| Methanol | 1300-2000 |
| Ethanol | 280-620 |
| Propanol | 20-360 |

Advantageously, the process conditions for light paraffin aromatization overlap those for methanol conversion to gasoline. Further, both paraffin aromatization and conversion of methanol to gasoline are catalyzed by medium pore zeolites. It has been found that the addition of a dehydrogenation metal such as gallium to the zeolite lowers the paraffin aromatization temperature range to the preferred range between about 400° C. and 600° C. (750° F. and 1100° F.), enabling the endothermic aromatization reaction to proceed in the preferred temperature range for the exothermic conversion of methanol to gasoline. Useful reactor configurations include fixed, fluid and moving-bed designs.

Generally, the zeolites effective for methanol conversion can be used for upgrading of paraffins to aromatics under the conditions described here. Windows of 10-membered rings are preferred, although, in some instances, excessive puckering of the rings or pore blockage may render these zeolites ineffective. Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732 discloses Constraint Index values for typical zeolite materials and is incorporated by reference as is set forth at length herein.

In some preferred aspects, the catalyst can be a zeolite having a Constraint Index of between about 1 and about 12. Examples of such zeolite catalysts include ZSM-5, ZSM-11, ZSM-12, ZSM-22, ZSM-23, ZSM-35 and ZSM-48.

Additional supported metals can also be beneficial for the upgrading of paraffins to aromatics. Suitable additional metals include Ga, Zn, and Group 8-10 metals (according to the group definitions in the IUPAC periodic table). More generally, suitable metals for dehydrogenation of paraffins to assist with aromatic formation can include oxides and sulfides of Groups 4, 5, 6, 7, 8-10, 13, and mixtures thereof. Thus, dehydrogenation may be promoted by sulfides and oxides of gallium, indium, titanium, zirconium, vanadium, mobium, tantalum, chromium, molybdenum, tungsten and mixtures thereof. Oxides of chromium alone or in conjunction with other catalytically active species have been shown to be particularly useful in dehydrogenation. Other catalytically active compounds include sulfides and oxides of manganese, iron, cobalt, rhodium, iridium, nickel, palladium, platinum and mixtures thereof.

The above-listed metals may be exchanged onto zeolites to provide a zeolite catalyst having dehydrogenation activity. Gallium has been found to be particularly useful for promoting dehydrogenation in the present process.

In some aspects, a common regenerator can be used for regeneration of the catalyst in the conversion reactor and the catalyst in the upgrading reactor. In such aspects, due to the common regeneration, the same catalyst can be used for both oxygenate conversion and paraffin upgrading to aromatics. In such aspects, a catalyst suitable for performing upgrading paraffins to aromatics can be selected. In such aspects, the Alpha value for the catalyst can be selected to be between 40 and 150.

Additional Embodiments

Embodiment 1. A method for conversion of an oxygenate feed, comprising: exposing a feed comprising one or more oxygenates to a first conversion catalyst at an average reaction temperature of 230° C. to 425° C., a total pressure of 10 psig (~70 kPag) to 400 psig (~2800 kPag), and a WHSV of 0.1 $hr^{-1}$ to 10.0 $hr^{-1}$, to form a conversion effluent, separating a light paraffin stream comprising $C_3$-$C_4$ paraffins and a stream comprising $C_{5+}$ hydrocarbons from the conversion effluent; and exposing at least a portion of the light paraffin stream and an oxygenate co-feed to a second conversion catalyst at an average reaction temperature of 450° C. or more to form an upgraded effluent comprising aromatics, a weight ratio of the oxygenate co-feed to $C_3$-$C_4$ paraffins in the at least a portion of the light paraffin stream being 1.0 to 1.5.

Embodiment 2. The method of Embodiment 1, i) wherein the feed comprises methanol, dimethyl ether, or a combination thereof; ii) wherein the feed further comprises olefins; or iii) a combination of i) and ii).

Embodiment 3. The method of any of the above embodiments, wherein the light paraffin stream comprises 1.0 wt % to 50 wt % of $C_3$-$C_4$ paraffins, or wherein the at least a portion of the light paraffin stream comprises 1.0 wt % to 50 wt % or more $C_3$-$C_4$ paraffins, or a combination thereof.

Embodiment 4. The method of any of the above embodiments, wherein the conversion effluent comprises $C_2$ paraffins, and wherein the at least a portion of the light paraffin stream comprises 50 wt % or more of the $C_2$ paraffins from the conversion effluent.

Embodiment 5. The method of any of the above embodiments, wherein the oxygenate co-feed comprises methanol, or wherein the oxygenate co-feed comprises an additional portion of the feed, or a combination thereof.

Embodiment 6. The method of any of the above embodiments, wherein the $C_{5+}$ fraction separated from the conversion effluent comprises an octane rating of 80 or more (or 90 or more).

Embodiment 7. The method of any of the above embodiments, wherein the first conversion catalyst comprises ZSM-5, or wherein the second conversion catalyst comprises ZSM-5, or a combination thereof.

Embodiment 8. The method of any of the above embodiments, wherein the second conversion catalyst further comprises 0.1 wt % to 5.0 wt % of one or more metals from Groups 4, 5, 6, 7, 8-10, or 13; or wherein the second conversion catalyst further comprises 0.1 wt % to 5.0 wt % of Ga, Zn, or a combination thereof.

Embodiment 9. The method of any of the above embodiments, wherein exposing the feed to the first conversion catalyst comprises exposing the feed to the first conversion catalyst in at least one of a fluidized bed environment and a moving bed environment; or wherein exposing the at least a portion of the light paraffins and the oxygenate co-feed to the second conversion catalyst comprises exposing the at least a portion of the light paraffins and the oxygenate co-feed to the second conversion catalyst in at least one of a fluidized bed environment and a moving bed environment; or a combination thereof.

Embodiment 10. The method of Embodiment 9, wherein the first conversion catalyst is the same as the second conversion catalyst, the method further comprising regenerating at least a portion of the first conversion catalyst and regenerating at least a portion of the second conversion catalyst, wherein the at least a portion of the first conversion catalyst and the at least a portion of the second conversion catalyst are regenerated in a common regenerator.

Embodiment 11. The method of any of the above embodiments, the method further comprising: passing at least a portion of the upgraded effluent into a de-ethanizer to form an upgraded product fraction and a lower boiling fraction; combining at least a portion of the upgraded product fraction with at least a portion of the stream comprising $C_{5+}$ hydrocarbons from the conversion effluent to form a combined product stream; and fractionating the combined product stream to form one or more naphtha boiling range product fractions.

Embodiment 12. A system for conversion of an oxygenate feed, comprising: a conversion reactor comprising a conversion feed inlet, a first conversion catalyst, and a conversion effluent outlet; a separation stage comprising a separation inlet in fluid communication with the conversion effluent outlet, a light paraffin outlet, and a $C_{5+}$ outlet; and an upgrading reactor comprising an upgrading reactor feed inlet in fluid communication with the light paraffin outlet, a second conversion catalyst, and an upgraded effluent outlet.

Embodiment 13. The system of Embodiment 12, wherein the separation stage comprises: a product separator comprising a product separator inlet in fluid communication with the conversion effluent outlet, a water outlet, and a separated product outlet; and a stabilizer comprising a stabilizer inlet in fluid communication with the separated product outlet, a first stabilizer outlet in fluid communication with the upgrading reactor feed inlet, and the $C_{5+}$ outlet.

Embodiment 14. The system of Embodiment 12 or 13, wherein a) the system further comprises a regenerator comprising a first regenerator inlet and a first regenerator outlet in fluid communication with the conversion reactor and a second regenerator inlet and a second regenerator outlet in fluid communication with the upgrading reactor, or b) the system further comprises a conversion regenerator associated with the conversion reactor and an upgrading regenerator associated with the upgrading reactor.

Embodiment 15. The system of any of Embodiments 12-14, the system further comprising: a de-ethanizer comprising a de-ethanizer inlet in fluid communication with the upgraded effluent outlet, an ethane outlet, and a recycle outlet in fluid communication with the stabilizer inlet; and a fractionator comprising a fractionator inlet in fluid communication with the $C_{5+}$ outlet, and one or more fractionator outlets.

All numerical values within the detailed description and the claims herein are modified by "about" or "approximately" the indicated value, and take into account experimental error and variations that would be expected by a person having ordinary skill in the art.

While the present invention has been described and illustrated by reference to particular embodiments, those of ordinary skill in the art will appreciate that the invention lends itself to variations not necessarily illustrated herein.

For this reason, then, reference should be made solely to the appended claims for purposes of determining the true scope of the present invention.

The invention claimed is:

1. A method for conversion of an oxygenate feed, comprising:
    exposing a feed comprising one or more oxygenates to a first conversion catalyst at an average reaction temperature of 230° C. to 425° C., a total pressure of 10 psig to 400 psig, and a WHSV of 0.1 $hr^{-1}$ to 10.0 $hr^{-1}$, to form a conversion effluent,
    separating a light paraffin stream comprising C3-C4 paraffins and a stream comprising C5+ hydrocarbons from the conversion effluent; and
    exposing at least a portion of the light paraffin stream and an oxygenate co-feed to a second conversion catalyst at an average reaction temperature of 450° C. or more to form an upgraded effluent comprising aromatics, a weight ratio of the oxygenate co-feed to C3-C4 paraffins in the at least a portion of the light paraffin stream being 1.0 to 1.5;
    wherein the conversion effluent comprises C2 paraffins, and wherein the at least a portion of the light paraffin stream comprises 50 wt % or more of the C2 paraffins from the conversion effluent.

2. The method of claim 1, wherein the feed comprises methanol, dimethyl ether, or a combination thereof.

3. The method of claim 1, wherein the oxygenate co-feed comprises methanol, wherein the oxygenate co-feed comprises an additional portion of the feed, or a combination thereof.

4. The method of claim 1, wherein the light paraffin stream comprises 1.0 wt % to 50 wt % of C3-C4 paraffins, wherein the at least a portion of the light paraffin stream comprises 1.0 wt % or more of C3-C4 paraffins, or a combination thereof.

5. The method of claim 1, the method further comprising:
    passing at least a portion of the upgraded effluent into a de-ethanizer to form an upgraded product fraction and a lower boiling fraction;
    combining at least a portion of the upgraded product fraction with at least a portion of the stream comprising C5+ hydrocarbons from the conversion effluent to form a combined product stream; and
    fractionating the combined product stream to form one or more naphtha boiling range product fractions.

6. The method of claim 1, wherein the feed further comprises olefins.

7. The method of claim 1, wherein the C5+ fraction separated from the conversion effluent comprises an octane rating of 80 or more.

8. The method of claim 1, wherein the first conversion catalyst comprises ZSM-5, wherein the second conversion catalyst comprises ZSM-5, or a combination thereof.

9. The method of claim 1, wherein the second conversion catalyst further comprises 0.1 wt % to 5.0 wt % of one or more metals from Groups 4, 5, 6, 7, 8-10, or 13.

10. The method of claim 1, wherein the second conversion catalyst further comprises 0.1 wt % to 5.0 wt % of Ga, Zn, or a combination thereof.

11. The method of claim 1, wherein exposing the feed to the first conversion catalyst comprises exposing the feed to the first conversion catalyst in at least one of a fluidized bed environment and a moving bed environment.

12. The method of claim 11, wherein exposing the at least a portion of the light paraffins and the oxygenate co-feed to the second conversion catalyst comprises exposing the at least a portion of the light paraffins and the oxygenate co-feed to the second conversion catalyst in at least one of a fluidized bed environment and a moving bed environment.

13. The method of claim 12, wherein the first conversion catalyst is the same as the second conversion catalyst.

14. The method of claim 12, the method further comprising regenerating at least a portion of the first conversion catalyst and regenerating at least a portion of the second conversion catalyst, wherein the at least a portion of the first conversion catalyst and the at least a portion of the second conversion catalyst are regenerated in a common regenerator.

* * * * *